(12) United States Patent
Joern et al.

(10) Patent No.: US 8,771,445 B2
(45) Date of Patent: Jul. 8, 2014

(54) METHOD FOR PRODUCING SINGLE-OR MULTI-LAYERED FIBER PREFORMS BY THE TFP PROCESS

(75) Inventors: Paul Joern, Hamburg (DE); Ulrich Eberth, Rain (DE)

(73) Assignee: Airbus Operations GmbH, Hamburg (DE)

( * ) Notice: Subject to any disclaimer, the term of this patent is extended or adjusted under 35 U.S.C. 154(b) by 1421 days.

(21) Appl. No.: 11/988,990

(22) PCT Filed: Jul. 24, 2006

(86) PCT No.: PCT/EP2006/064573
§ 371 (c)(1),
(2), (4) Date: Feb. 12, 2010

(87) PCT Pub. No.: WO2007/010052
PCT Pub. Date: Jan. 25, 2007

(65) Prior Publication Data
US 2010/0126652 A1    May 27, 2010

(30) Foreign Application Priority Data
Jul. 22, 2005  (DE) .................. 10 2005 034 393

(51) Int. Cl.
| | |
|---|---|
| B32B 7/08 | (2006.01) |
| B29C 53/82 | (2006.01) |
| B29C 65/00 | (2006.01) |
| B32B 37/00 | (2006.01) |
| A61F 13/15 | (2006.01) |
| B29C 51/16 | (2006.01) |
| B32B 38/10 | (2006.01) |
| B29C 63/10 | (2006.01) |

(52) U.S. Cl.
USPC ............. 156/93; 156/155; 156/160; 156/212; 156/229; 156/247; 156/701

(58) Field of Classification Search
USPC ......... 156/60, 91, 92, 98, 148, 155, 166, 168, 156/180, 181, 160, 163, 196, 211, 212, 213, 156/214, 221, 222, 224, 229, 242, 243, 244, 156/244.22, 244.23, 244.24, 246, 247, 248, 156/250, 254, 256, 267, 296, 307.1, 307.3, 156/307.4, 307.5, 701, 93
See application file for complete search history.

(56) References Cited

U.S. PATENT DOCUMENTS

| | | | |
|---|---|---|---|
| 4,917,756 A | 4/1990 | Cahuzac et al. | |
| 5,490,602 A | 2/1996 | Wilson et al. | |
| 2004/0074589 A1* | 4/2004 | Gessler et al. ................ | 156/155 |
| 2004/0134593 A1 | 7/2004 | Ishibashi et al. | |
| 2006/0169396 A1* | 8/2006 | Joern ............................ | 156/166 |

FOREIGN PATENT DOCUMENTS

| | | | | |
|---|---|---|---|---|
| DE | 691 06 404 T2 | 5/1995 | | |
| DE | 100 61 028 A1 | 6/2002 | | |
| DE | 101 23 064 A1 | 11/2002 | | |
| DE | 10123064 A1 * | 11/2002 | ............. | B29C 70/48 |
| EP | 0 284 497 | 9/1988 | | |
| GB | 2 268 699 | 1/1994 | | |
| GB | 2268699 A * | 1/1994 | ............. | B29C 41/38 |
| JP | 64-009725 | 1/1989 | | |
| JP | 06-278234 | 10/1994 | | |
| JP | 2002-321215 | 11/2002 | | |
| JP | 2004-218133 | 8/2004 | | |
| JP | 2004-529786 | 9/2004 | | |
| JP | 2009-506221 | 2/2009 | | |
| WO | WO 2004039566 A1 * | 5/2004 | ............. | B29C 70/30 |

* cited by examiner

OTHER PUBLICATIONS

"Erlauterungen zur TFP--Technologie", www.hightex-dresden.de/tfptech Internet Citation. Mar. 7, 2005. PDF dated Sep. 27, 2006.

Primary Examiner — Philip Tucker
Assistant Examiner — Brian R Slawski
(74) Attorney, Agent, or Firm — Greer, Burns & Crain Ltd.

(57) ABSTRACT

Disclosed is a method for producing single- or multi-layered fiber preforms by the TFP process with fiber strands which are aligned in particular such that they are oriented with the flux of force, wherein the fiber preforms have virtually any desired material thickness without troublesome backing layers and have virtually any desired surface geometry, comprising the steps of: laying and attaching the fiber strands on a flexible and elastic base, in particular a base formed by an elastomer, with a fixing thread led through a sewing head to form the fiber perform; and lifting the fiber preform off the elastic and flexible base. The fiber preforms produced by means of this method have a virtually optimum fiber alignment, that is to say substantially oriented with the flux of force, and no appreciable flaws in the arrangement of fibers, and consequently make it possible to create composite components that can withstand extreme mechanical stress and are at the same time lightweight, for example by subsequent processing in the RTM process.

21 Claims, 1 Drawing Sheet

METHOD FOR PRODUCING SINGLE-OR MULTI-LAYERED FIBER PREFORMS BY THE TFP PROCESS

FIELD OF THE INVENTION

The invention relates to a method for producing single- or multi-layered fiber preforms by the TFP process ("Tailored Fiber Placement") with fiber strands which are aligned in particular such that they are oriented with the flux of force, wherein the fiber preforms have virtually any desired material thickness without troublesome backing layers and have virtually any desired surface geometry.

BACKGROUND OF THE INVENTION

In lightweight construction, in particular in aircraft construction, use is increasingly being made of composite components made of fiber-reinforced plastics, which can withstand extreme mechanical loads and at the same time offer a high weight-saving potential. These components are formed with reinforcing fibers which are subsequently saturated or impregnated with a curable polymer material, for example a polyester resin, an epoxy resin or the like, to form the finished component.

The alignment of the reinforcing fibers in a component of this type has a decisive influence on its rigidity and strength. To achieve optimum mechanical properties, the reinforcing fibers should, if possible, follow the direction of loading and not have any undulations. In addition, it is desirable for each individual reinforcing fiber to be subjected to uniform loading.

With conventional semifinished products, such as, for example, woven or laid fiber fabrics, for reinforcement of the polymer material, not all conceivable fiber orientations can be realized, since there the reinforcing fibers always run with a specific orientation.

One possible way of complying with a requirement for fiber alignment in accordance with loading is the TFP process ("Tailored Fiber Placement"). This involves the laying of fiber strands for mechanical reinforcement ("rovings"), which are in turn formed by a multiplicity of discrete reinforcing fibers running parallel to one another, along any desired path curve and attaching them with the aid of a fixing thread on a backing layer, whereby the alignment of the individual fiber strands can be adapted virtually optimally to the flux of force acting on the finished composite component. The optimum utilization of the mechanical load-bearing capacity of the fiber strands that is achieved in this way can minimize their number, and consequently also the weight. Moreover, the cross section of the component can be adapted in an ideal way to the respective local loads. Furthermore, reinforcements can be formed specifically in zones that are subjected to particular loading, such as, for example, regions where force is introduced or the like, by laying additional fiber strands. The discrete reinforcing fibers are, for example, glass fibers, carbon fibers, aramid fibers or the like.

The production of fiber preforms by means of the TFP process is performed on customary CNC-controlled automatic sewing and embroidering machines, which are also used, for example, in the textile industry. Once all the required layers have been laid with fiber strands, the finished fiber preform, which generally already has the desired final contour, is placed in a closable mould, and impregnated with a curable polymer material and subsequently cured to form the finished composite component. A number of TFP fiber preforms and/or layers of reinforcing fabrics may be combined with one another here. The impregnation of the fiber preforms with the curable polymer material may be performed, for example, by means of known RTM processes ("Resin Transfer Moulding") in a correspondingly designed mould. If appropriate, any backing layer material that protrudes beyond a given edge contour of the fiber preform is cut off before carrying out the RTM process.

However, with the fixing thread and the backing layer, the TFP process introduces into the fiber preform two components that no longer perform any function in the later composite component. Specifically, the backing layer causes difficulties in realizing an ideal sequence of layers and represents a not insignificant proportion of the overall weight, in particular if a number of fiber preforms are placed one on top of the other. Although the backing layer may also be formed by a woven reinforcing fabric, for example by a woven glass- or carbon-fiber fabric, even in this case at least some of the reinforcing fibers have an alignment that is not in accordance with the loading. Moreover, the woven reinforcing fabric is also impaired by the penetration with the sewing needle during the TFT process, so that the characteristic material values may be impaired.

Furthermore, it is known to use a solid foam core as a supporting structure for the forming of three-dimensional fiber preforms, the fixing threads being firmly clamped in the upper side of the foam core by means of a tufting method, so that there is no need for an additional lower fixing thread. In the case of this method, however, a special foam core must be kept in stock for each fiber preform with a different surface geometry.

SUMMARY OF THE INVENTION

It is one of the objects of the invention to improve the known TFP process for producing fiber preforms to the extent that fiber preforms are produced with virtually any desired material thickness and without the disturbing influence of a backing layer that is otherwise necessary for the TFP process remaining on the fiber preform, only a universal base having to be kept in stock for the production of fiber preforms with different surface geometries. In addition, the attachment of the fixing threads in this base is to be improved.

Accordingly, a method for producing single- or multi-layered fiber preforms by the TFP process with fiber strands which are aligned such that they are oriented with the flux of force, wherein the fiber preforms have virtually any desired material thickness without troublesome backing layers and have virtually any desired surface geometry, comprises the steps of:

a) changing the surface geometry of a flexible and elastic base for adaptation to a surface geometry that is intended for the fiber preform before the laying and attaching of the fiber strands on the base, the base being formed by a rubber sheet or a silicone sheet, b) laying and attaching the fiber strands on the base with a fixing thread led through a sewing head to form the fiber preform, c) inserting the fixing thread into the base by means of a needle arranged on the sewing head, such that the fixing thread is introduced into the base and fixing thread loops formed as a result are firmly held in the base, and d) lifting the fiber preform off the base.

As a result of the elastically and flexibly formed base, fiber preforms with different three-dimensional surface geometries can be produced on one and the same universal base.

In accordance with one embodiment of the method according to the invention, a surface geometry of the base is changed before the laying and attaching of the fiber strands for adaptation to a surface geometry that is intended for the fiber preform.

This makes it possible to provide the base, and consequently also the fiber preform to be laid on it, with any desired surface geometry from the beginning, so that a fiber preform that has right away virtually any desired three-dimensional surface geometry can be laid and attached using a device that is suitable for carrying out the TFP process, for example a CNC-controlled device.

Furthermore, the variability of the surface geometry of the base allows the production of a large number of different preforms with different surface geometries on one and the same base.

In accordance with a further embodiment, the surface geometry of the base is changed before the lifting off of the fiber preform for adaptation to a surface geometry that is intended for the fiber preform.

As a result, it is possible, for example, to form the base initially in the form of a plane and to lay and attach the fiber strands on it by means of the TFP process. Subsequently, the base can be given a surface geometry that differs from the planar shape, curved three-dimensionally in virtually any way desired. Consequently, the fiber strands can first be laid and attached in the xy plane to form the fiber preform by computer-controlled standard automatic sewing and embroidering machines. Subsequently, the base is then given a different surface geometry, which, for example, corresponds to a surface shape of a half cylinder. To form the fiber preform, it is consequently possible to use a constructionally less complex standard automatic sewing and embroidering machine, which only allows positioning of the sewing head in the spatial xy direction, producing a considerable time and cost saving potential.

In accordance with a further embodiment, the surface geometry of the base is predetermined by supporting elements.

This makes it possible, in particular in combination with a CNC-controlled automatic sewing and embroidering machine or the like, to produce fiber preforms with different surface geometries on one and the same universal base.

In accordance with a further embodiment of the method according to the invention, the supporting elements are moved by an open-loop and closed-loop control device for adaptation to a surface geometry that is intended for the fiber preform.

The fact that the supporting elements can be individually activated by means of the open-loop and closed-loop control device allows the base to be given virtually any desired surface geometry. The supporting elements may be formed here, for example, as movable rams or supports that are arranged uniformly spaced apart, are arranged underneath the base to hold it up and the paths along which they move are monitored in at least one spatial dimension, for example by an open-loop and closed-loop control device or manually. With preference, both tensile and compressive forces can be applied to the base by means of the positionable rams, in order to achieve a variable deformation of the base.

The open-loop and closed-loop control device for varying the surface geometry of the base is preferably coupled here with the CNC control or the computer control of the automatic sewing and embroidering machine that is used for carrying out the TFP process, or represent part of this control.

A further embodiment provides that the fiber preform is fixed before the lifting off from the elastic and flexible base.

As a result, any undesired displacements of the fiber strands that occur within the fiber preform as a result of the lifting off from the base are largely avoided. A thermoplastic powder that melts at a low temperature, a curable adhesive or the like may be used, for example, for fixing the fiber strands in the fiber preform.

DETAILED DESCRIPTION OF THE INVENTION

Figure 1:
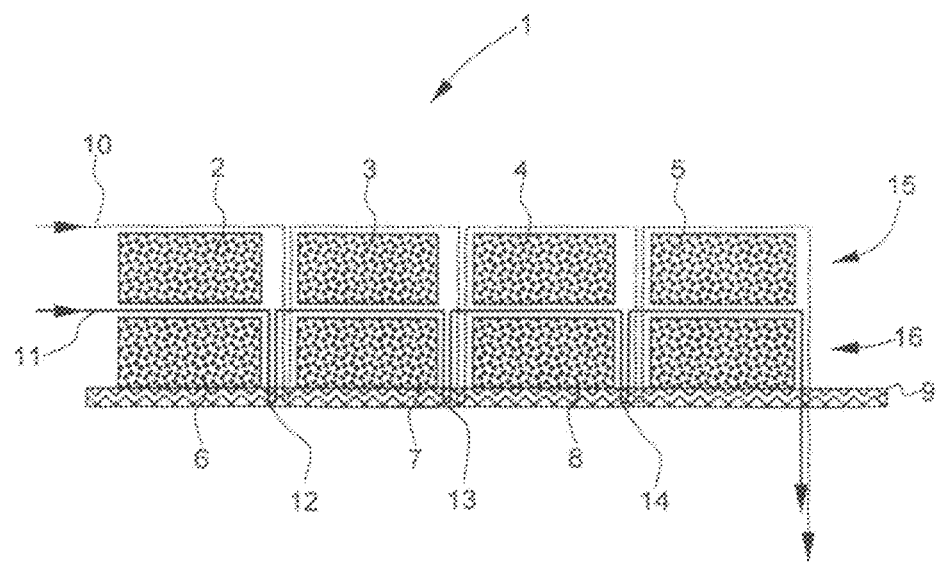
FIG. 1 shows a cross-sectional representation of a fiber preform formed by the method according to the invention on an elastic and flexible base and FIG. 2 shows a perspective representation of an exemplary forming process for the elastic and flexible base with fiber strands lying on it.
Figure 2:
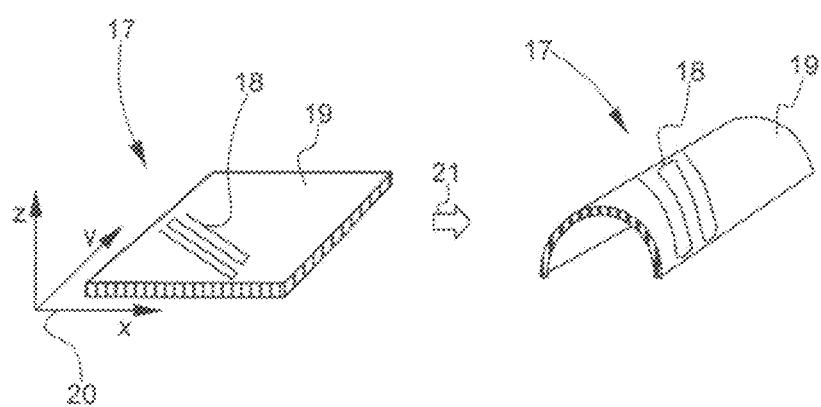

The sequence of the method according to the invention is to be described on the basis of FIG. 1 and FIG. 2.

FIG. 1 firstly shows the sequence of the method according to the invention on the basis of the formation of a planar fiber preform 1. To form the fiber preform 1, in accordance with the known TFP process ("Tailored Fiber Placement"), a multiplicity of fiber strands 2 to 8 ("rovings") are laid and attached on the elastic and flexible base 9 as the backing layer, in particular in a direction oriented with the flux of force. The base 9 may be formed, for example, by an elastic and flexible sheet of an elastomer, in particular a rubber sheet or a rubber mat or the like. The fiber strands 2 to 8 are built up by a multiplicity of discrete reinforcing fibers ("filaments"), which in FIG. 1 run approximately perpendicularly to the plane of the drawing. Glass fibers, carbon fibers, aramid fibers or the like are used, for example, as reinforcing fibers. The laying of the fiber strands 2 to 8 on the base 9 is performed by an automatic sewing and embroidering machine, which is not represented any more specifically but has a correspondingly formed sewing head for guiding the fiber strands 2 to 8. The sewing head may serve at the same time for attaching the fiber strands 2 to 8 on the elastic base 9. With preference, the sewing head is monitored by means of an open-loop and closed-loop control device that is not represented, for example a CNC control or the like, to create any desired laying curves of the fiber strands 2 to 8, in particular curves appropriate for the flux of force.

The attaching of the fiber strands 2 to 8 on the base 9 takes place by the fixing threads 10, 11, which are introduced at least partially into the base 9 by means of a needle arranged on the sewing head. Fixing thread loops 12 to 14 thereby form, making it possible for the fixing threads 10, 11 to be securely fastened in the base 9 without the requirement of an additional lower fixing thread ("tufting method"). The fixing thread loops 12 to 14 are firmly held here by being clamped in as a result of suitable frictional conditions within the base 9. As a result, uncontrolled displacement of the laid fiber strands 2 to 8 on the base 9 is avoided. With preference, the fiber strands 2 to 8 are attached on the base 9 by zigzag stitches.

To ensure a secure hold of the fixing thread loops 12 to 14 within the elastic and flexible base 9 and at the same time ensure the adaptability of the latter to different surface geometries, it is formed by an elastomer or some other material that has elastic and flexible properties. For example, the elastic and flexible base 9 may be formed as a rubber sheet or silicone sheet. The base 9 performs the same function as the backing layer, generally similar to a woven fabric, along with a lower fixing thread, that is necessary in the case of conventional TFP processes, but additionally makes it possible to produce fiber preforms with a complex surface geometry without the requirement to keep in stock supporting bodies in the form of solid foam cores that are respectively adapted to the desired surface geometry of the fiber preform to be produced.

In the shown exemplary embodiment of FIG. 1, the fiber preform 1 has two layers 15, 16. Here, the fiber strands 6, 7, 8 are laid in the lower layer 16, while the fiber strands 2 to 5 are arranged in the upper layer 15. By means of the method according to the invention, fiber preforms 1 with virtually any desired number of layers arranged one on top of the other can be formed. The maximum number of fiber strands 2 to 8 that can be laid one on top of the other in the TFP process is limited substantially by the length of the needle used, since the needle with the fixing thread has to pierce through all the layers, including part of the base 9.

After the completion of the fiber preform 1, it can be detached from the base 9 without adversely affecting the integrity of the fiber strands 6, 7, 8, because the fiber preform 1 is only loosely held or "tufted" on it by the fixing thread loops 12, 13, 14. After the detachment of the fiber preform 1, only the fixing threads 10, 11 remain in the fiber preform 1, so that the mechanical properties of the fiber preform 1 are not appreciably impaired by this.

Since the production of a planar fiber preform 1 should first be described, the base 9 has a planar surface geometry throughout the method sequence. If, however, fiber preforms with curved surface geometries are to be produced, it is required to use supporting elements to provide the elastic and flexible base 9 with the intended surface geometry before and/or after the completion of the laying and attaching process.

FIG. 2 illustrates by way of example the forming of a fiber preform 1 (cf. FIG. 1) with an initially planar surface geometry into the fiber preform 17, which has approximately the surface geometry of a half-cylinder.

Firstly, a fiber strand 18 is laid and attached on a planar, elastic and flexible base 19. Here, the fiber strand 18 is representative of a multiplicity of further fiber strands, which have not been represented for the sake of a better overview of the drawing. The procedure when laying and attaching the fiber strand 18 on the initially planar, elastic and flexible base 19 corresponds here to the statements made in the course of the description of FIG. 1.

The forming of the initially planar base 19 produces in particular the advantageous effect that automatic sewing and embroidering machines of a simple construction can be used for laying and attaching the fiber strand 18, since only movement of the sewing head in the xy direction of the system of coordinates 20, i.e. parallel to the plane defined by the base 19, is necessary. An additional movement option of the sewing head parallel to the z direction of the system of coordinates 20 is not required.

Following this, as indicated by the arrow 21, the base 19 is formed in such a way that it is given, for example, the surface geometry of a half-cylinder. Following this, the fiber preform 17 can be lifted off the base 19 for further processing. Instead of the surface geometry of a half-cylinder, the base 19 may be given virtually any conceivable surface geometry, for example also a geometry that is spherically curved at least in certain portions.

The deforming of the elastic and flexible base 19 may be performed, for example, by supporting elements that are not represented. These supporting elements are arranged such that they are uniformly spaced apart in the manner of a matrix underneath the elastic and flexible base 6. The supporting elements may, for example, be formed as vertically movable rams or the like, it being possible for the paths along which they move to be monitored in the z direction of the system of coordinates 20 by means of the open-loop and closed-loop control device, so that fiber preforms 17 with virtually any desired surface geometry can be formed by means of the method according to the invention. The open-loop and closed-loop control device here allows a virtually fully automatic and highly precise sequence of the process of deforming the elastic and flexible base 19 and the process of laying and attaching the fiber strands to form the fiber preforms 17. Consequently, fiber preforms 17 with virtually any desired surface geometry and high dimensional stability can be produced in great numbers virtually fully automatically by means of the method according to the invention. Furthermore, the base 19 can be accommodated in a clamping frame, in order already to achieve a substantially planar starting surface geometry, in particular in the case of a small material thickness of the base that is used, without any adjustment or holding up by the supporting elements.

After the completion of the process of deforming the base 19, the fiber preform 17 can be easily detached from the latter and cured to form a finished fiber reinforced composite component, for example by means of the known RTM process ("Resin Transfer Moulding"). For this purpose, the fiber preform 17 is saturated or impregnated with a curable polymer material, for example a polyester resin, an epoxy resin or the like. After the detachment of the fiber preform 17 from the base 19, it may be necessary in advance to bring the edge contours of the fiber preforms 17 to predetermined required dimensions by trimming.

To ensure adequately secure fixing of the fiber strand 18, the fiber preform 17 may, if appropriate, be additionally fixed with a binder before the lifting off from the base 19 and/or before the deforming of the base 19. Thermoplastics that melt in a temperature range between 50° C. and 150° C. and/or suitable adhesives, for example hotmelt adhesives, come into consideration in particular as binders. These binders may be applied, for example, in powder form into and/or onto the fiber preform 17.

Apart from the fixing threads, no troublesome elements, in particular backing layers or the like, that could lead to impairment of the mechanical properties of the fiber preform 17 remain within the fiber preforms 17 after the detachment of the fiber preform 17 from the base 19. As a result, to produce fiber reinforced composite components with a greater material thickness, a number of correspondingly formed fiber preforms can be arranged one on top of the other to form multi-layered fiber preforms, before they are placed into a mould for carrying out the RTM process. The mechanical properties of the multi-layered fiber preforms formed in this way are not impaired by backing layers or other intermediate layers or the like that are required in the course of the TFP process.

It must be taken into account for the method that the presented sequence of the individual method steps is only of an exemplary character and it is possible if need be to depart from the method sequence explained.

By means of the method according to the invention, fiber preforms which have a fiber alignment that is substantially oriented with the flux of force and may also have a surface geometry that departs from a planar shape can be produced in a simple way. The fiber preforms can, moreover, be produced on computer-controlled automatic sewing and embroidering machines, the sewing head of which can only be positioned in the xy plane, so that a considerable time and cost saving is obtained. The fiber preforms formed in accordance with the method according to the invention may be used, for example, for producing composite components by the RTM process.

The composite components produced in this way have a virtually optimum fiber alignment, that is to say substantially oriented with the flux of force, and no appreciable flaws in the laminate structure, and consequently make it possible to create components that can withstand extreme mechanical stress and, moreover, have only a very low weight.

The invention accordingly relates to a method for producing single- or multi-layered fiber preforms 1, 17 by the TFP process with fiber strands 2 to 8, 18 which are aligned in particular such that they are oriented with the flux of force, the fiber preforms 1, 17 having virtually any desired material thickness without troublesome backing layers and virtually any desired surface geometry, comprising the steps of:

laying and attaching the fiber strands 2 to 8, 18 on a flexible and elastic base 9, 19, in particular a base 9, 19 formed by an elastomer, with a fixing thread 10, 11 led through a sewing head to form the fiber preform 1, 17 and lifting the fiber preform 1, 17 off the base 9, 19.

The surface geometry of the base 9, 19 is preferably changed before the laying and attaching of the fiber strands 2 to 8, 18 for adaptation to a surface geometry that is intended for the fiber preform 1, 17.

The surface geometry of the base 9, 19 is changed before the lifting off of the fiber preform 1, 17, for example for adaptation to a surface geometry that is intended for the fiber preform 1, 17.

The surface geometry of the base 9, 19 is also advantageously predetermined by supporting elements.

The supporting elements are moved, for example, by an open-loop and closed-loop control device for adaptation to a surface geometry that is intended for the fiber preform 1, 17.

The fiber preform 1, 17 is fixed before the lifting off from the base 9, 19.

The fixing of the fiber preform 1, 17 is performed in particular with a binder, in particular with a thermoplastic material and/or an adhesive.

The fixing thread 10, 11 is introduced into the base 9, 19, for example, by piercing the base 9, 19 by means of a needle arranged on the sewing head, and formed fixing thread loops 12-14 are in this way firmly held in the base 9, 19.

The position of the sewing head with respect to the base 9, 19 is advantageously monitored in at least two spatial dimensions by the open-loop and closed-loop control device, in order to make virtually any desired laying curves of the fiber strands 2-8, 18 on the base 9, 19 possible, in particular curves oriented with the flux of force.

At least in certain regions, at least two fiber strands 2-8, 18 are, for example, laid on the base 9, 19 and fixed, in order to form a fiber preform 1, 17 with at least two layers 15, 16.

After the detachment from the base 9, 19, at least two fiber preforms 1, 17 are advantageously arranged one on top of the other to form a multi-layered fiber preform 1, 17.

What is claimed is:

1. A method for producing single- or multi-layered fiber preforms by the TFP process with fiber strands which are aligned such that they are oriented with a flux of force, wherein the fiber preforms have virtually any desired material thickness without troublesome backing layers and have virtually any desired surface geometry, comprising the steps of:
   a) providing a flexible and elastic base and a clamping frame, wherein the flexible and elastic base is accommodated in the clamping frame,
   b.) providing supporting elements which are activatable by means of an open-loop and closed-loop control device, changing the surface geometry of the flexible and elastic base by moving at least one of the support elements for adaptation to a surface geometry that is intended for the fiber preform before the laying and attaching of the fiber strands on the base, the base being formed by a rubber sheet or a silicone sheet,
   c) laying and attaching the fiber strands on the base with a fixing thread led through a sewing head to form the fiber preform, wherein the position of the sewing head with respect to the base is monitored in at least two spatial dimensions by an open-loop and closed-loop control device, in order to make virtually any desired laying curves of the fiber strands on the base possible,
   d) inserting the fixing thread into the base by means of a needle arranged on the sewing head, such that the fixing thread is introduced into the base and fixing thread loops formed as a result are firmly held in the base,
   e) in addition to the fixing thread, fixing the fiber preform with an additional binder, wherein the binder is applied at least into or onto the fiber preform, and
   f) lifting the fiber preform off the base.

2. The method according to claim 1, wherein the surface geometry of the base is changed before the lifting off of the fiber preform for adaptation to a surface geometry that is intended for the fiber preform.

3. The method according to claim 1, wherein the surface geometry of the base is predetermined by the supporting elements.

4. The method according to claim 1, wherein the supporting elements are moved by an open-loop and closed-loop control device for adaptation to a surface geometry that is intended for the fiber preform.

5. The method according to claim 1, wherein the binder is at least one of a thermoplastic material and an adhesive.

6. The method according to claim 1, wherein the curves are oriented with the flux of force.

7. The method according to claim 1, wherein, at least in certain regions, at least two fiber strands are laid on the base and fixed, in order to form a fiber preform with at least two layers.

8. The method according to claim 1, wherein, after the detachment from the base, at least two fiber preforms are arranged one on top of the other to form a multi-layered fiber preform.

9. The method according to claim 1, wherein the binder is applied in powder form.

10. The method according to claim 9, wherein the binder is at least one of a thermoplastic material or an adhesive.

11. The method according to claim 1, wherein at least the sewing head is moved relative to the base.

12. The method according to claim 1, wherein the base is moved relative to the sewing head.

13. The method according to claim 1, wherein the base is moved relative to the sewing head and the sewing head is moved relative to the base.

14. A method for producing single- or multi-layered fiber preforms by the TFP process with fiber strands which are aligned such that they are oriented with a flux of force, wherein the fiber preforms have virtually any desired material thickness without troublesome backing layers and have virtually any desired surface geometry, comprising the steps of:
   a) providing a flexible and elastic base and a clamping frame, wherein the flexible and elastic base is accommodated in the clamping frame,
   b) providing supporting elements which are activatable by means of an open-loop and closed-loop control device, changing the surface geometry of the flexible and elastic base for adaptation to a surface geometry that is intended for the fiber preform before the laying and attaching of the fiber strands on the base, the base being formed by a rubber sheet or a silicone sheet,
   c) laying and attaching the fiber strands on the base with a fixing thread led through a sewing head to form the fiber preform, wherein the position of the sewing head with respect to the base is monitored in at least one spatial dimension by an open-loop and closed-loop control device, in order to make virtually any desired laying curves of the fiber strands on the base possible, d) inserting the fixing thread into the base by means of a needle arranged on the sewing head, such that the fixing thread is introduced into the base and fixing thread loops formed as a result are firmly held in the base, e) in addition to the fixing thread, fixing the fiber preform with an additional binder, wherein the binder is applied at least into or onto the fiber preform, and f) lifting the fiber preform off the base.

15. The method according to claim 14, wherein the sewing head is moved relative to the base.

16. The method according to claim 14, wherein the base is moved relative to the sewing head.

17. The method according to claim 14, wherein the base is moved relative to the sewing head and the sewing head is moved relative to the base.

18. A method for producing single- or multi-layered fiber preforms by the TFP process with fiber strands which are aligned such that they are oriented with a flux of force, wherein the fiber preforms have virtually any desired material thickness without troublesome backing layers and have virtually any desired surface geometry, comprising the steps of:

a) laying and attaching the fiber strands on a flexible and elastic base formed by a rubber sheet or a silicone sheet with a fixing thread led through a sewing head to form the fiber preform, wherein the position of the sewing head with respect to the base is monitored in at least two spatial dimensions by an open-loop and closed-loop control device, in order to make virtually any desired laying curves of the fiber strands on the base possible, b) providing supporting elements which are activatable by means of an open-loop and closed-loop control device, changing the surface geometry of the flexible and elastic base for adaptation to a surface geometry that is intended for the fiber preform before the laying and attaching of the fiber strands on the base, the base being formed by a rubber sheet or a silicone sheet, c) inserting the fixing thread into the base by means of a needle arranged on the sewing head, such that the fixing thread is introduced into the base and fixing thread loops formed as a result are firmly held in the base, d) in addition to the fixing thread, fixing the fiber preform with an additional binder, wherein the binder is applied at least into or onto the fiber preform, e) changing the surface geometry of the flexible and elastic base for adaptation to a surface geometry that is intended for the fiber preform after fixing the fiber preform, and f) lifting the fiber preform off the base.

19. The method according to claim 14, wherein tensile and compressive forces can be applied to the base by means of the supporting elements.

20. The method according to claim 14, wherein the support elements are individually activable by means of the open-loop and closed-loop control device.

21. The method according to claim 14, wherein the open-loop and closed-loop control device monitoring the position of the sewing head with respect to the base is the same open-loop and closed-loop control device activating the supporting elements.

* * * * *